June 19, 1945.  C. A. OSBORNE  2,378,786
MANUFACTURE OF A PIGMENT PASTE FROM THE WATER PULP COLOR
Filed Feb. 27, 1942

INVENTOR
C. A. OSBORNE
BY
ATTORNEYS

Patented June 19, 1945

2,378,786

UNITED STATES PATENT OFFICE 2,378,786

MANUFACTURE OF A PIGMENT PASTE FROM THE WATER PULP COLOR

Clare Alexander Osborne, Toronto, Ontario, Canada

Application February 27, 1942, Serial No. 432,682

11 Claims. (Cl. 106—309)

This invention relates to the manufacture of a pigment paste from the water pulp color.

The invention particularly relates to improvements in the manufacture of oil color paste directly from the water pulp color normally used for producing a pigment paste for use in printing ink, paint, lacquer color base and pigmented coatings.

The manufacture of pigment paste from pulp color is usually effected at the present time by two fairly well-known methods. In both these methods it is necessary to produce the pigment in cake form which in itself, where completely dry cake is involved, requires a lengthy process to produce.

To produce pigment in cake form it is necessary to form a water suspension of the pigment and to pass this mixture into a filter press whereupon the major part of the water is pressed from the pigment until the cake is produced.

The most widely used of the two methods referred to begins with the pulp color in cake form after it has been taken from the filter press. The color is then introduced to drying ovens on a series of trays and subjected to a hot air treatment for a period of approximately one week for the purpose of evaporating all the water and leaving a hard dry cake of color in crystalline form. The dry cake is next introduced to high speed pulverizers, usually one machine for each of the several primary colors, to reduce it to an extremely fine powder in which condition it is generally known as "dry color."

The dry color so produced is then ready to be used in printing ink, paint, lacquer, etc., but first it is necessary to grind it in oil or varnish. This operation consists in mixing the dry color with the oil in various types of mixing apparatus and subjecting the paste produced to various grinding devices known as roller ink mills, stone mills, etc. This grinding operation requires from two to ten or more grinding operations in the mill depending on the color and the degree of dispersion required.

The second and less widely used method above mentioned is the so-called "flushing process" which starts with the pulp color in cake form but eliminates the drying, pulverizing and grinding in oil. In this method the filter cake is introduced to a vacuum chamber, oil or varnish being added, and subjected to a process which removes the moisture from the mixture under heat and vacuum, leaving a paste of color dispersed in oil.

These two methods have distinct disadvantages. In the case of the first one, it is obvious that a number of steps are required to produce the product desired. On the other hand, the drying operation alone requires a large amount of space and oven equipment and also involves great expense in supplying heat for evaporation apart from the long time element necessary for drying. In addition to these disadvantages, the labour element in operation of the process is very considerable while ink grinding mills necessary for this process are very costly.

The second method, while eliminating a number of steps of the first, also is disadvantageous since the machinery necessary is very expensive. Above all, this is but a "batch" process requiring anywhere from 24 to 36 hours to produce a small batch of color paste of several hundred pounds depending upon the size of the machine which renders the process in itself very expensive. Moreover, each machine must be confined to one particular color as it requires the best part of a day or more to clean a machine for the use of another color.

I have found that it is possible to produce a color paste of the character in question in a much simpler way avoiding the disadvantages of the prior methods. It is, therefore, an object of the present invention to avoid the many disadvantages of the prior art and to produce a process through which pigment paste may be produced by a continuous process in a simple manner.

A further object of the invention is to provide a relatively inexpensive process through which a color pigment paste is produced in a comparatively short space of time, much shorter than has been the case in the past.

According to the invention in its most general form, an emulsion of the water pulp color and a suitable vehicle is produced. The emulsion is then coated upon a surface whereupon such coating is subjected to a heat treatment to drive off the water constituent of the emulsion and the residual pigment paste is then collected from the said surface.

The vehicle employed may have an emulsifying constituent or may have emulsifying properties. Otherwise, however, an emulsifying agent is added thereto to form with the pulp color an oil in water emulsion by the aid of rapid agitation. The vehicle, of course, refers to the water immiscible or water insoluble phase of the emulsion other than the pigment.

The preferred method according to the present invention is to spray the emulsion upon the surface of a revolving drum and to subject the coating to a heat treatment between the point of coating and a point where the pigment paste is removed leaving at the point of removal a film of pigment dispersed in oil or varnish which is usually non-drying at this stage. At the point of removal, a doctor blade or the like may be positioned in contact with the drum surface to scrape off the pigment paste residue. The spraying may be done in a vacuum chamber if desired and the heat treatment may in either case be effected by an internal and/or external heating of the drum in any suitable way although I prefer to subject the coating on the drum to infra-red rays as a means of thoroughly penetrating the coating and subjecting it to a heat treatment which though effective will not be rigorous.

The invention will be fully understood by reference to the following detailed specification taken in conjunction with the accompanying drawing.

Figure 1:
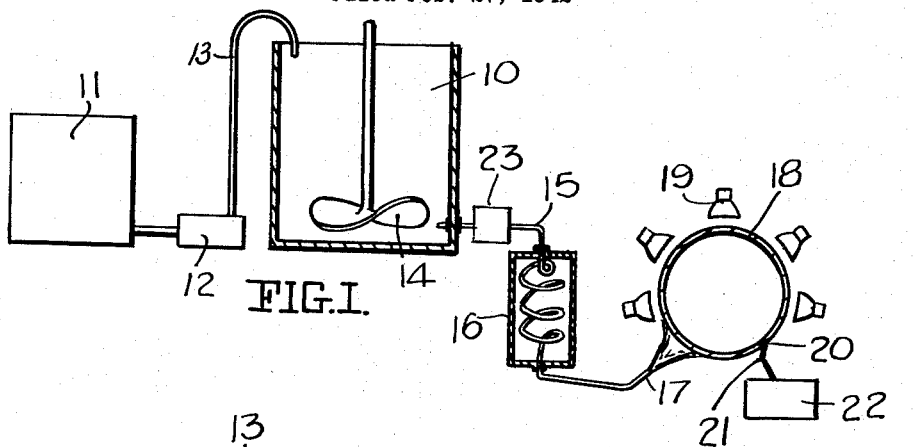
Fig. 1 is a schematic illustration partly in section of one combination of elements for carrying out my process.

Referring to the drawing and particularly to Fig. 1, the water pulp color is introduced to a suitable vat 10. Preferably this pulp color which initially is pigment suspended in water is subjected to the action of a filter press to eliminate some of the water prior to the time that it is put into the vat 10. A suitable vehicle such as oil or varnish, which may be carried in a suitable vat 11, is introduced to the vat 10 by way of a pump 12 and conduit 13 and if necessary an emulsifying agent is introduced to vat 10. In some cases, however, the vehicle may have an emulsifying constituent or the vehicle itself may have emulsifying properties and in this case it would be unnecessary to add an emulsifying agent. The vat 10 is provided with any suitable agitating means as may be necessary here depicted as a paddle member 14 and the constituents of the mixture are subjected to rapid agitation so as to produce an emulsion. The emulsified liquid may then be passed by way of a suitable conduit 15 through a heater 16 to raise the emulsion to a desired temperature after which it is sprayed from a nozzle or a series of nozzles 17 on to the surface of the revolving drum 18. The size of the drum is chosen in relation to the time it is desired to subject the sprayed emulsion to heat treatment, and in this respect the size of the drum is, of course, coordinated with the speed of rotation of the drum.

The spray will produce a continuous coating on the drum surface as it revolves and, disposed about that part of the surface which carries the coating, are a series of infra-red ray lamps 19, to subject the coating to a heat treatment to drive off the water constituent of the emulsion so that when the coating reaches that area of the drum surface indicated by the numeral 20, the water constituent of the emulsion has been completely eliminated. Then, by means of a scraper, doctor blade, or the like, 21, the coating is removed and collected in a suitable receptacle 22.

Extreme heat for the purpose of evaporating the water constituent of the emulsion in some cases would be injurious to the color of the resultant paste and I, therefore, propose to evaporate the water by means that will avoid, where necessary, the use of extreme heat. This may be done by suitably positioning and controlling infra-red ray lamps in relation to the coating of emulsion and may be done in other ways as will hereinafter appear. However, as some color may be produced with the use of a heat treatment of fairly high degree, it will be understood that my method generally contemplates any suitable means of heat treatment.

The apparatus employed for carrying out the method generally illustrated in Fig. 1 may incorporate a so-called colloid mill 23 in the pipe line 15 between the vat 10 and the heater 16. This is for the purpose of producing a very fine emulsion.

Figure 2:
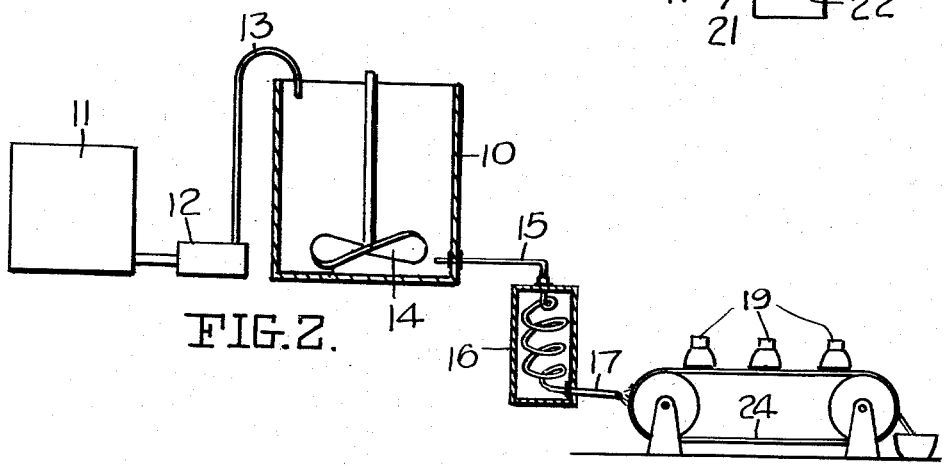
Fig. 2 is a schematic illustration similar to Fig. 1 showing a different type of surface upon which the emulsion produced by the process is coated.

The apparatus schematically illustrated in Fig. 2 differs only from that shown in Fig. 1 by the substitution of an endless belt 24 which takes the place of the revolving drum 19 with similar results.

Instead of spraying the emulsion onto a surface such as disclosed in Figs. 1 and 2, the emulsion may be applied to the surface by causing the drum 18 to dip into a vat 25 carrying the emulsion so that the surface may be continuously coated with the emulsion, the thickness of the coating being controlled in any suitable manner such as by a roller 26 or instead by means of a suitable blade or the like, adjustable means being provided to gauge the depth of the coating by adjusting the distance between the roller and the drum. In this method of applying the coating, a suitable doctor blade 27 or the like may be employed to cause the pigment paste to discharge finally into a suitable receptacle 28 after having been subjected to a heat treatment such as by the infra-red ray lamps 19.

Figure 4:
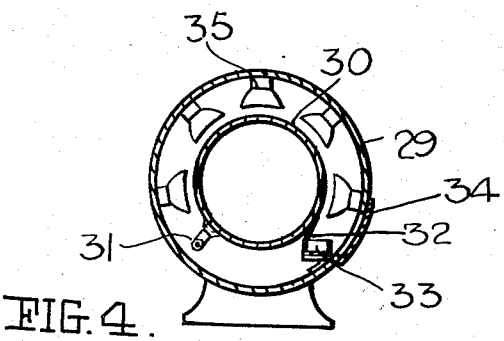
Fig. 4 is a schematic illustration partly in section of a drum on to which the emulsion is sprayed operating within a vacuum chamber.
Figure 3:
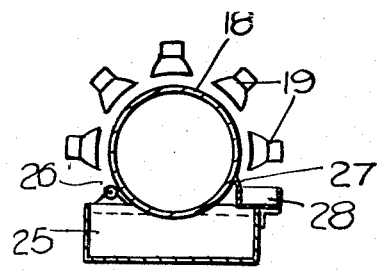
Fig. 3 is a schematic illustration of a drum operating in a vat as an alternative to the means of coating the emulsion.
Figure 5:
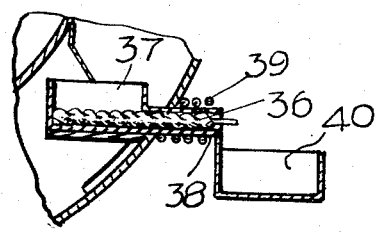
Fig. 5 is a fragmentary sectional detail of an alternative method of removing a color paste from a vacuum chamber.

The method may generally be carried out under vacuum or below atmospheric pressure by employing (as shown in Fig. 4) a vacuum drum 29 within which a revolving drum 30 is positioned. In this instance the emulsion is sprayed on to the drum 30 in a heated condition from the nozzle or nozzles 31 and the coating is removed from the drum 30 by means of a suitable scraper or doctor blade 32 causing the pigment paste so produced to discharge into the receptacle 33. In this instance, the vacuum drum may be provided with a suitable inlet opening covered by a cover plate or the like 34 and the receptacle may from time to time be removed from the vacuum chamber and replaced by another receptacle.

The heating in the vacuum drum may be carried out in various manners. For instance, a sufficient heat might be applied to the interior of the drum 30 so as to gauge its temperature to avoid chilling of the emulsion as it is sprayed on the drum 30. The action of the vacuum on the heated emulsion would, therefore, function to eliminate or drive off the water constituent of the emulsion at reduced temperature during the time of the travel of the emulsion between the point of spraying and its point of removal. On the other hand, infra-red ray lamps 35 may be employed if desired in combination with the spraying under vacuum or other suitable heat treating means.

Alternatively the pigment paste might be removed from the vacuum drum 29 by means of a screw conveyor 36 communicating with the interior of the receptacle 37 by means of a conduit 38. In this case a chilling coil or the like 39 may be disposed around the conduit 38 so as to render the pigment paste more viscous and in this instance the pigment paste filling the conduit 38 will form in itself a seal so as to avoid raising the pressure within the vacuum drum. The pigment paste would then discharge from the conveyor into a suitable receptacle 40.

By this simple general method I am able to produce a pigment paste, in a continuous process, which is ready for use as a base for printing ink, paint, lacquer color base and pigmented coatings, or which is ready for use in this way by very little if any further processing.

The method may be employed with any of the well-known materials for producing such pigment pastes with or without the use of an emulsifying agent depending upon whether the vehicle chosen has an emulsifying constituent or has emulsifying properties. In other words, the method follows the general principle of the mixing of oil and water as an emulsion and the subsequent elimination of the water to produce a desired residue in a simple manner. For instance, film forming materials, including different oils, such as linseed, castor, etc., natural and synthetic resins and including film forming materials, such as nitrocellulose, ethylcellulose and chlorinated rubber, water immiscible solvents as benzine, toluol, kerosene, turpentine, when used as solvents for certain of the film forming materials; may be mixed with water by means of emulsifying agents and rapid agitation to form a completely homogeneous mixture which when carried through the steps of the process will produce the desired product depending upon the combinations used and the objective in view. In some cases an emulsifying agent would not be necessary where the vehicle includes material having emulsifying properties, such as in certain synthetic resins.

Any suitable apparatus may be used to carry out the method of the present invention.

While it is preferred to introduce the pulp color in the form of a moist filter cake to the vat for mixing with the vehicle, after having taken a good proportion of the water from it in the filter press, it is, of course, possible to introduce the pulp color as a liquid after a proportion of the water has been decanted in the usual way in the preliminary steps of forming the pulp color.

From the foregoing it will be appreciated that my invention has many advantages among which are simplicity of operation, extreme saving in time and labour, as the color base may be made within an hour as compared with several days at least by the most widely used method, a saving in space, the provision of a continuous process, an extremely high production, the elimination of expensive pulverizing, mixing and grinding machinery, and flexibility since the apparatus can be changed from operation with a dark color to a light color or vice versa substantially within half an hour.

What I claim as my invention is:

1. The continuous method of producing a pigment paste directly from a moist water pulp color in one general stage of operation which comprises forming an emulsion of a water pulp color and a film forming material, coating said emulsion thinly upon a moving surface, subjecting said coating to a heat treatment to drive off the water constituent of the emulsion, and collecting the residual pigment paste from said moving surface.

2. The method of producing a pigment paste directly from a moist water pulp color in one general stage of operation which comprises forming an emulsion of a water pulp color and a film forming material, coating said emulsion thinly upon a movable surface, subjecting said coating to infra-red rays to penetrate the coating with heat whereby to drive off the water constituent of the emulsion, and collecting the residual pigment paste.

3. The method of producing a pigment paste directly from a moist water pulp color in one general stage of operation which comprises forming an emulsion of a water pulp color and a film forming material, coating said emulsion thinly upon a movable surface within an atmosphere below atmospheric pressure, subjecting said coating to a heat treatment to drive off the water constituent of the emulsion, and collecting the residual pigment paste.

4. The method as claimed in claim 3 in which the heat treatment consists in subjecting the coating to infra-red rays.

5. The method of producing a pigment paste directly from a moist water pulp color in one general stage of operation which comprises forming an emulsion of a water pulp color and a film forming material, spraying said emulsion onto a movable surface to form a coating, subjecting said coating to a heat treatment to drive off the water constituent of the emulsion, and collecting the residual pigment paste.

6. The method of producing a pigment paste directly from a moist water pulp color in one general stage of operation which comprises forming an emulsion of a water pulp color and a film forming material, coating said emulsion thinly upon a movable surface, controlling the depth of the coating on said surface, subjecting said coating to a heat treatment to drive off the water constituent of the emulsion, and collecting the residual pigment paste.

7. The method of producing a pigment paste directly from a moist water pulp color in one general stage of operation which comprises forming an emulsion of a water pulp color and a film forming material, coating the surface of a drum thinly with said emulsion while rotating said drum so as to move the emulsion so coated from the point of coating to a point of removal, subjecting said coating to a heat treatment between the point of coating and removal to drive off the water constituent of the emulsion, and collecting the residual pigment paste from the surface of said drum at the point of removal.

8. The method of producing a pigment paste directly from a moist water pulp color in one general stage of operation which comprises forming an emulsion of a water pulp color and a film forming material, coating the surface of a belt thinly with said emulsion while rotating said belt so as to move the emulsion so coated from the point of coating to a point of removal, subjecting said coating to a heat treatment between the point of coating and removal to drive off the water constituent of the emulsion, and collecting the residual pigment paste from the surface of said belt at the point of removal.

9. The method of producing a pigment paste directly from a moist water pulp color in one general stage of operation which comprises forming an emulsion of a water pulp color and a film forming material, spraying the surface of a drum thinly to coat it with said emulsion, rotating said drum so as to move the emulsion so coated from the point of coating to a point of removal, subjecting said coating to a heat treatment between the point of coating and removal to drive off the water constituent of the emulsion, and collecting the residual pigment paste from the surface of said drum at the point of removal.

10. The method of producing a pigment paste directly from a moist water pulp color in one general stage of operation which comprises forming an emulsion of a water pulp color and a film forming material, coating the surface of a drum thinly with said emulsion within a vacuum chamber, rotating said drum so as to move the emulsion so coated from the point of coating to a point of removal, subjecting said coating to a heat treatment between the point of coating and removal to drive off the water constituent of the emulsion, and collecting the residual pigment paste from the surface of said drum at the point of removal.

11. The method of producing a pigment paste directly from a moist water pulp color in one general stage of operation which comprises forming an emulsion of a water pulp color and a film forming material, spraying said emulsion onto a movable surface within a vacuum chamber to form a coating, subjecting said coating to a heat treatment to drive off the water constituent of the emulsion, and collecting the residual pigment paste.

C. ALEXANDER OSBORNE.